United States Patent [19]

Ohno et al.

[11] Patent Number: 4,697,187
[45] Date of Patent: Sep. 29, 1987

[54] PRECIPITATION LOSS COMPENSATION AND DISABLEMENT FOR AVOIDANCE OF SATELLITE TRANSPONDER OVERLOADING

[75] Inventors: Satoru Ohno; Yasuhisa Shimada, both of Tokyo, Japan

[73] Assignee: NEC Corporation, Japan

[21] Appl. No.: 707,746

[22] Filed: Mar. 4, 1985

[30] Foreign Application Priority Data

Mar. 9, 1984 [JP] Japan .................................. 59-45260

[51] Int. Cl.[4] ...................... H04R 7/185; H04B 7/185; G01S 13/00
[52] U.S. Cl. .................................... 342/358; 342/353; 364/517; 455/69; 455/12
[58] Field of Search ............... 343/358, 356, 357, 353, 343/352; 364/514, 517; 455/10, 12, 52, 70, 136, 234, 69; 342/352, 353, 356–358

[56] References Cited

U.S. PATENT DOCUMENTS 4,261,054 4/1981 Scharla-Nielsen ................... 343/353

Primary Examiner—Theodore M. Blum
Assistant Examiner—Gregory C. Issing
Attorney, Agent, or Firm—Laff, Whitesel, Conte & Saret

[57] ABSTRACT

A transmitting power control system is disclosed wherein a master earth station sends a pilot signal to a satellite which retransmits it to the master station as well as to slave earth stations. A beacon signal is also sent from the satellite to the master station which compares it with the received pilot signal and controls its own transmission power level according to the result of the comparison so that the power level of retransmitted pilot signal is maintained constant. A warning signal is sent from the master station to all the slave stations when the received pilot signal decreases below a prescribed value corresponding to a predetermined precipitation. Each slave station receives the pilot signal from the satellite and controls its own transmission power level according to the received pilot signal. A disabling circuit is provided in each slave station to disable the power control function of the own station in response to the warning signal to prevent the satellite from being overloaded by the information signals transmitted from the slave earth stations.

3 Claims, 3 Drawing Figures

PRECIPITATION LOSS COMPENSATION AND DISABLEMENT FOR AVOIDANCE OF SATELLITE TRANSPONDER OVERLOADING

BACKGROUND OF THE INVENTION

The present invention relates to satellite communication transmitting power control systems, and in particular to a precipitation loss compensation power control system for a satellite communication system operating in the submillimeter or millimeter band which is susceptible to precipitation.

For satellite communication systems operating in the submillimeter band, the transmitting power of an earth station is controlled in such a manner that it compensates for the precipitation loss of uplink signals. One example of such power control systems is shown and described in Japanese Patent Publication 58-84544. In the system described in this Patent Publication, the master earth station transmits a pilot signal to a satellite which receives and retransmits it to the master earth station while at the same time transmitting to it a beacon signal. These earth-bound signals are received and compared with each other by the master earth station. From the result of comparison is derived a control signal which regulates in a closed loop the transmission power level of the master earth station so that the effective isotropically radiated power (EIRP) of the retransmitted pilot signal is maintained constant. Each of a plurality of slave earth stations provides estimation on the precipitation attenuation of the uplink signal in accordance with a level variation that occurs in the regulated pilot signal to control its own power level. While this system is economically attractive as it eliminates the need to provide a beacon receiver, for each slave earth station the EIRP of the retransmitted pilot signal drops when precipitation exceeds a prescribed limit beyond which the master earth station's transmission power is out of control. Each slave earth station interprets this situation as the occurrence between precipitation loss of its down link and increase its transmission power. As a result, the transponder of the satellite is overloaded and intermodulation is likely to occur.

SUMMARY OF THE INVENTION

An object of the present invention is therefore to provide a transmitting power control system for a satellite communication network which keeps the satellite transponder from being overloaded by signals transmitted from slave earth stations when the master earth station is subjected to a severe precipitation loss.

The satellite communication network to which the present invention applies comprises a satellite for transmitting a beacon signal and receiving and retransmitting a pilot signal, a master earth station having uplinks and downlinks established through said satellite to the downlinks and uplinks of a plurality of slave earth stations. In the transmitting power control system of the invention, the master earth station comprises a pilot signal generator for generating a pilot signal to be transmitted to the satellite, means for receiving the pilot signal retransmitted from the satellite, means for receiving the beacon signal, and a variable gain amplifier for providing amplification of uplink information signals and the generated pilot signal. The master station further includes a comparator for comparing the received pilot and beacon signals and a power control circuit that controls the gain of the amplifier means in accordance with the output of the comparator so that the effective isotropically radiated power of the retransmitted pilot signal is maintained constant, and means for generating a warning signal when the received pilot signal decreases below a prescribed value corresponding to a predetermined precipitation.

Each of the slave earth stations comprises a variable gain amplifier for providing amplification of an uplink information signal and means for receiving the pilot signal from the satellite. A power control circuit is included for controlling the gain of the amplifier in accordance with the received pilot signal. A disabling circuit is responsive to the warning signal for disabling the controlling means to prevent the satellite from being overloaded by the information signals transmitted from the slave earth stations.

Preferably, the warning signal generator disables the pilot signal generator when the received pilot signal decreases below the prescribed value, and the disabling circuit is a circuit that detects when the received pilot signal is below a prescribed value corresponding to the predetermined precipitation for disabling the power control circuit when the received pilot signal decreases below the prescribed value.

BRIEF DESCRIPTION OF THE DRAWINGS

The present invention will be described in further detail with reference to the accompanying drawings, in which.

DETAILED DESCRIPTION

Figure 1:
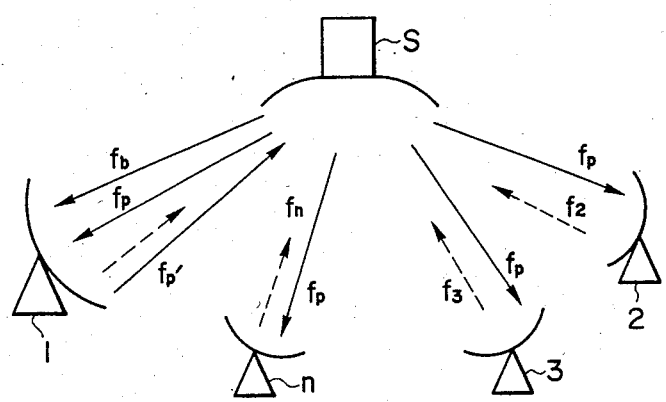
FIG. 1 is a schematic block diagram of a transmitting power control system for a satellite communication network having a master earth station and a plurality of slave earth stations.

In a satellite communication network, shown in FIG. 1, a pilot signal fp' is transmitted from a master earth station 1 to a common transponder located in a geosynchronous communication satellite S. The satellite transponder receives the pilot signal, amplifies it and retransmits a pilot signal fp to a plurality of slave earth stations 2, 3 . . . n as well as to the master earth station 1. A beacon signal fb is also generated and transmitted from the satellite S to master earth station 1, which compares it with the retransmitted pilot signal fp to detect the difference in power level between the two signals and controls its own transmission power level in accordance with the difference power as will be detailed below. This power control operates in a closed loop so that the power level or carrier-to-noise ratio of the received beacon signal fb becomes equal to a preselected value obtained for a predetermined fine weather condition. With this closed loop operation the effective isotropically radiated power (EIRP) of the retransmitted pilot signal fp is maintained at a constant level. Each of the slave earth stations monitors the power level or carrier-to-noise ratio of the retransmitted pilot signal fp and estimates the uplink precipitation loss from correlation data representing the relationship between uplink and downlink precipitation loss values on the assumption that a decrease in the monitored value is due to the precipitation loss affecting on its own downlink. In accordance with the estimated loss values, the slave stations boost their transmission power levels of signals f2, f3 and fn.

Figure 2:
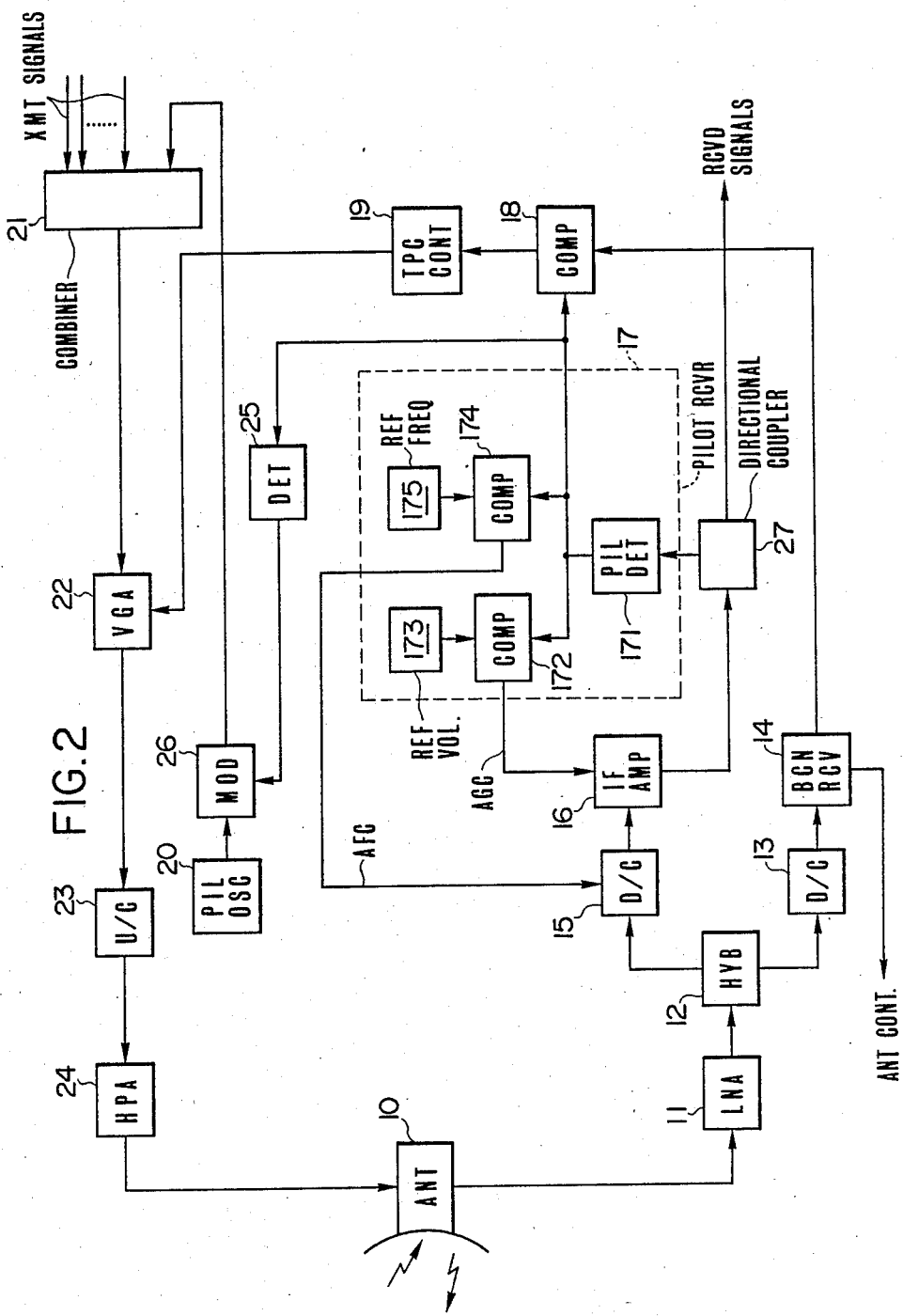
FIG. 2 is a block diagram of a master earth station power control system.

In FIG. 2, the pilot signal fp' is generated by a pilot oscillator 20 and fed to a phase-shift-keying modulator 26, for example. The PSK-modulated pilot signal is applied to a combiner 21 where it is combined with information signals and applied to a variable gain amplifier 22 and thence to an up-converter 23. After having been amplified by a high power amplifier 24, the output of up-converter 23 is supplied to an antenna 10 and transmitted to the satellite S. Signals received by antenna 10 from the satellite are passed through a low-noise amplifier 11 to a hybrid transformer 12 and applied to down-converters 13 and 15 which are respectively followed by a beacon receiver 14 and an IF amplifier 16. The output signal from the IF amplifier 16 is applied through a directional coupler 27 to a pilot receiver 17 and later stages for signal processing.

The pilot receiver 17 comprises a pilot detector 171 which detects the retransmitted pilot signal from the received signal and applies it to a voltage comparator 172 and a frequency comparator 174. The voltage comparator 172 compares the magnitude of the pilot signal with a reference voltage from source 173 and provides an automatic gain control signal to IF amplifier 16. The frequency comparator 174 compares the frequency of the pilot signal with a reference frequency from source 175 and provides an automatic frequency control signal to the down-converter 15. The detected pilot signal is also applied to a comparator 18 and to an alarm detector 25.

The beacon receiver 14 detects the beacon signal from the satellite and applies it to the comparator 18. The comparator 18 compares the pilot signal with the beacon signal and detects the ratio of the compared signal levels. The output of comparator 18 is applied to a transmitting power control unit 19, which generates a power control signal to variable gain amplifier 22 so that the beacon-to-pilot signal ratio detected by comparator 18 is maintained constant and therefore the EIRP of the retransmitted pilot signal is maintained at a constant value. The alarm detector 25 compares the power level or carrier-to-noise ratio of the pilot signal with a prescribed value which corresponds to a precipitation loss slightly lower than a limit beyond which variable gain amplifier 22 is out of its control range and generates a warning signal when that prescribed value is exceeded. The pilot modulator 26 is disabled in response to the warning signal to shut down the transmission of pilot signal.

Figure 3:
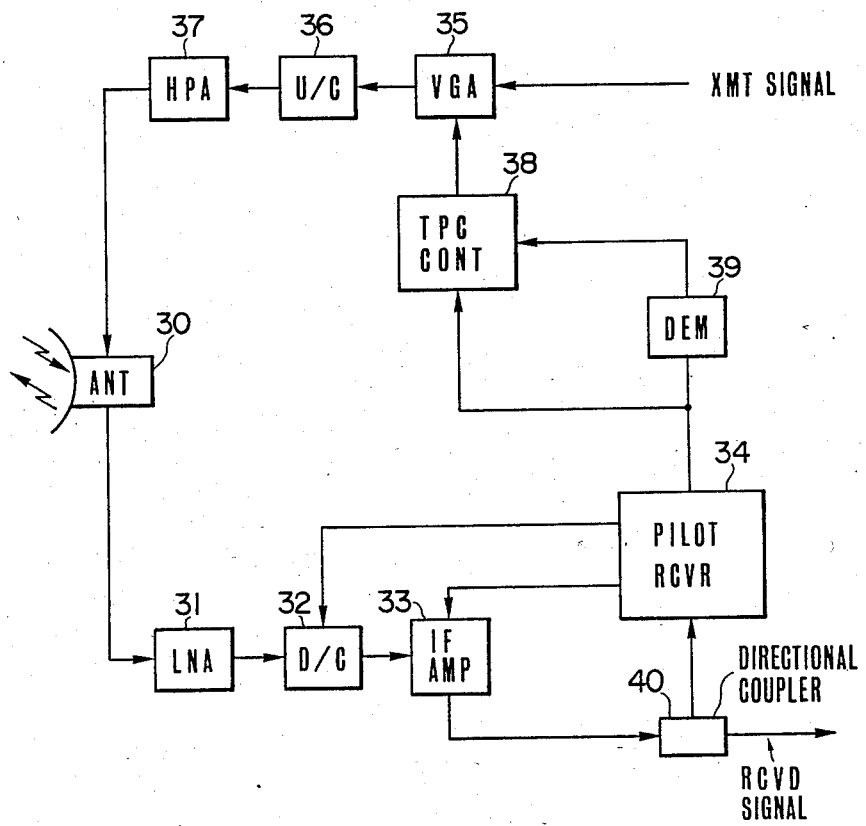
FIG. 3 is a block diagram of a slave earth station power control system.

In FIG. 3, an information signal is applied to a variable gain amplifier 35, thence to an up-converter 36 and a high power amplifier 37 to antenna 30. The retransmitted pilot signal fp, received by antenna 30, is passed through a low-noise amplifier 31, a down-converter 32 to an IF amplifier 33, the output of which is applied through a directional coupler 40 to a pilot receiver 34 and to a later stage for processing. The pilot receiver provides automatic gain control and automatic frequency control signals to the amplifier 33 and down-converter 32, respectively, in a manner similar to the master earth station, and provides a detected pilot signal to demodulator 39 and to a transmitting power control unit 38 whose output controls the amplifier 35.

The power control unit 38 compares the carrier-to-noise ratio of the pilot signal with a reference value which is derived from correlation between the amount of decrease in carrier-to-noise ratio in downlink and uplink pilot signals, and generates the gain control signal for amplifier 35. The alarm demodulator 39 demodulates the PSK pilot signal from receiver 34 enables the power control unit 38 when the pilot signal has a normal power level. When the master station stops transmitting the pilot signal, demodulator 39 applies a disable signal to the control unit 38 to shut off the power control operation of the slave station.

Therefore, in the event of a large precipitation over the area of the master earth station, the EIRP of the retransmitted pilot signal drops significantly and the modulated signal from the main station is interrupted to cause the slave stations to shutdown their transmission power control. The satellite's transponder is thus protected from overloading. Since the likelihood of there being a simultaneous occurrence of large scale precipitations over the master and slave stations is very slight, the shutdown of the power control operation in the slave stations does not affect on the overall operation of the system.

In the case of a demand assigned multiple access (DAMA) system in which a commmon signaling channel is provided between the master earth station and each slave station, it is possible to utilize these signaling channels to transmit the warning signal.

What is claimed is:

1. A transmitting power control system for a satellite communication network, the network comprising a satellite transponder for transmitting a beacon signal and for receiving and retransmitting a pilot signal from a master earth station having uplinks and downlinks connected through said satellite transponder to respective downlinks and uplinks of a plurality of slave earth stations, wherein:

said master earth station comprises means for generating a pilot signal to be transmitted to said satellite transponder, means for receiving said beacon signal and said retransmitted pilot signal from said transponder, said beacon and pilot signals being received through said downlinks of the master earth station, means for comparing the received beacon signal with the received pilot signal, first variable gain amplifier means for providing amplification of uplink information signals and the generated pilot signal with a variable gain in accordance with the result of the comparison by said comparing means so that the effective isotropically radiated power of the retransmitted pilot signal is maintained constant, means for disabling said pilot signal generating means when said received pilot signal decreases below a prescribed value corresponding to a predetermined amount of precipitation, and means for transmitting the amplified uplink information and pilot signals on said uplinks of the master earth station to said transponder; and each of said slave earth station comprises means for receiving the retransmitted pilot signal and a downlink information signal on the downlink of each slave earth station from said transponder, second variable gain amplifier means for providing amplification of an uplink information signal, means for controlling the gain of said second variable gain amplifier means in accordance with the pilot signal received by each slave earth station, and means responsive to the disablement of said pilot signal generating means of said master earth station for disabling said controlling means to prevent said satellite transponder from being overloaded by the uplink information signals transmitted from said slave earth stations on the uplinks thereof.

2. A transmitting power control system as claimed in claim 1, wherein said pilot signal generating means comprises an oscillator and a modulator for modulating a carrier with the output of said oscillator, the output of said modulator being coupled through said first variable gain amplifier means to one of the uplinks of said master earth station, said modulator being responsive to an output signal from said disabling means to disable the modulation of the carrier.

3. A transmitting power control system as claimed in claim 2, wherein said disabling means in each of said slave earth stations comprises a demodulator for demodulating the modulated carrier, the output of said demodulator being coupled to said controlling means to disable same.

* * * * *